United States Patent [19]

Park

[11] Patent Number: 5,742,460

[45] Date of Patent: Apr. 21, 1998

[54] MOVABLE FULL ERASING HEAD

[75] Inventor: Ki-Young Park, Seoul, Rep. of Korea

[73] Assignee: Daewoo Electronics Co., Ltd., Seoul, Rep. of Korea

[21] Appl. No.: 756,503

[22] Filed: Nov. 26, 1996

[30]     Foreign Application Priority Data

Nov. 28, 1995 [KR] Rep. of Korea ............... 1995-44374

[51] Int. Cl.$^6$ ........................................... G11B 5/58
[52] U.S. Cl. ........................................... 360/118; 360/85
[58] Field of Search ........................... 360/85, 93, 95, 360/66, 128, 129, 118

[56]                 References Cited

U.S. PATENT DOCUMENTS

| 4,652,948 | 3/1987 | Umeda ........................ 360/118 |
| 4,807,064 | 2/1989 | Miyamoto et al. ........... 360/95 |
| 4,811,134 | 3/1989 | Takano ......................... 360/95 |
| 4,837,645 | 6/1989 | Miyamoto et al. ........... 360/85 |
| 5,014,140 | 5/1991 | Nishida et al. ............... 360/95 |
| 5,025,331 | 6/1991 | Hirayama et al. ............ 360/95 |

FOREIGN PATENT DOCUMENTS

| 0169032 | 1/1986 | European Pat. Off. . |
| 4019742 | 1/1992 | Germany . |
| 59-077619 | 5/1984 | Japan . |
| 1085748 | 10/1967 | United Kingdom . |
| 1526175 | 9/1978 | United Kingdom . |
| 2078431 | 1/1982 | United Kingdom . |
| 2150733 | 7/1985 | United Kingdom . |

*Primary Examiner*—Jefferson Evans
*Attorney, Agent, or Firm*—Anderson, Kill & Olick, P.C.

[57]                 ABSTRACT

A full erasing head unit disposed on a deck chassis of a video cassette recorder includes a full erasing head, a base plate for mounting the full erasing head thereon in such a way that the full erasing head comes into contact with a traveling tape, the base member movably disposed on the deck chassis, a resilient member for exerting an elastic force on the base plate, a pin provided at the deck chassis and coming into contact with the resilient member in such a way that the resilient member biased by a tape tension is allowed to return to an initial position thereof, thereby additionally performing the role of the impedance roller.

5 Claims, 3 Drawing Sheets

MOVABLE FULL ERASING HEAD

FIELD OF THE INVENTION

The present invention relates to a video cassette recorder ("VCR"); and more particularly, to a movable full erasing head for use therein, which is also capable of performing the role of an impedance roller in a conventional VCR.

BACKGROUND OF THE INVENTION

Within the magnetic tape transportation path in a VCR, some oscillation and vibration suppression means are disposed in order to absorb oscillations and vibrations of the magnetic tape which cause jitter of a video signal. The oscillations and vibrations of the magnetic tape are produced by a head drum driving motor and a motor driving other moving components of the recorder mechanism and by the frictional forces resulting from the contact of the magnetic tape being transported via guide poles and the like. In conventional VCRs, an impedance roller has been used as means for suppressing such oscillations and vibrations to thereby prevent them from being transmitted to be picked up by the magnetic heads.

In FIG. 1, there is illustrated a plan view of a deck chassis 10 of a conventional VCR, showing an entire traveling path of a magnetic tape T from a supply reel 1 to a take-up reel 2. As shown, an impedance roller 3 is installed between a full erasing head 4 for erasing data on the magnetic tape T and a tension pole 5 which regulates a tape tension to an appropriate level. The impedance roller 3 serves to dampen or to reduce a lengthwise vibration of a running magnetic tape T by exerting its inertia on the running magnetic tape T.

However, inclusion of such an impedance roller in the VCR results in the increased number of parts and high unit cost.

SUMMARY OF THE INVENTION

It is, therefore, an object of the present invention to provide a full erasing head unit for use in a VCR, which is also capable of performing the role of an impedance roller.

In accordance with one aspect of the present invention, there is provided a full erasing head unit disposed on a deck chassis of a video cassette recorder, which is capable of performing the role of an impedance roller, the full erasing head unit comprising: a full erasing head; a base plate for mounting the full erasing head thereon in such a way that the full erasing head comes into contact with a traveling tape, the base plate movably disposed on the deck chassis; a resilient member for exerting an elastic force on the base plate, a pin provided at the deck chassis and coming into contact with the resilient member in such a way that the resilient member biased by a tape tension is allowed to return to an initial position thereof.

BRIEF DESCRIPTION OF THE DRAWINGS

The above and other objects and features of the present invention will become apparent from the following description of preferred embodiments, when taken in conjunction with the accompanying drawings, wherein.

DETAILED DESCRIPTION OF THE PREFERRED EMBODIMENTS

Figure 1:
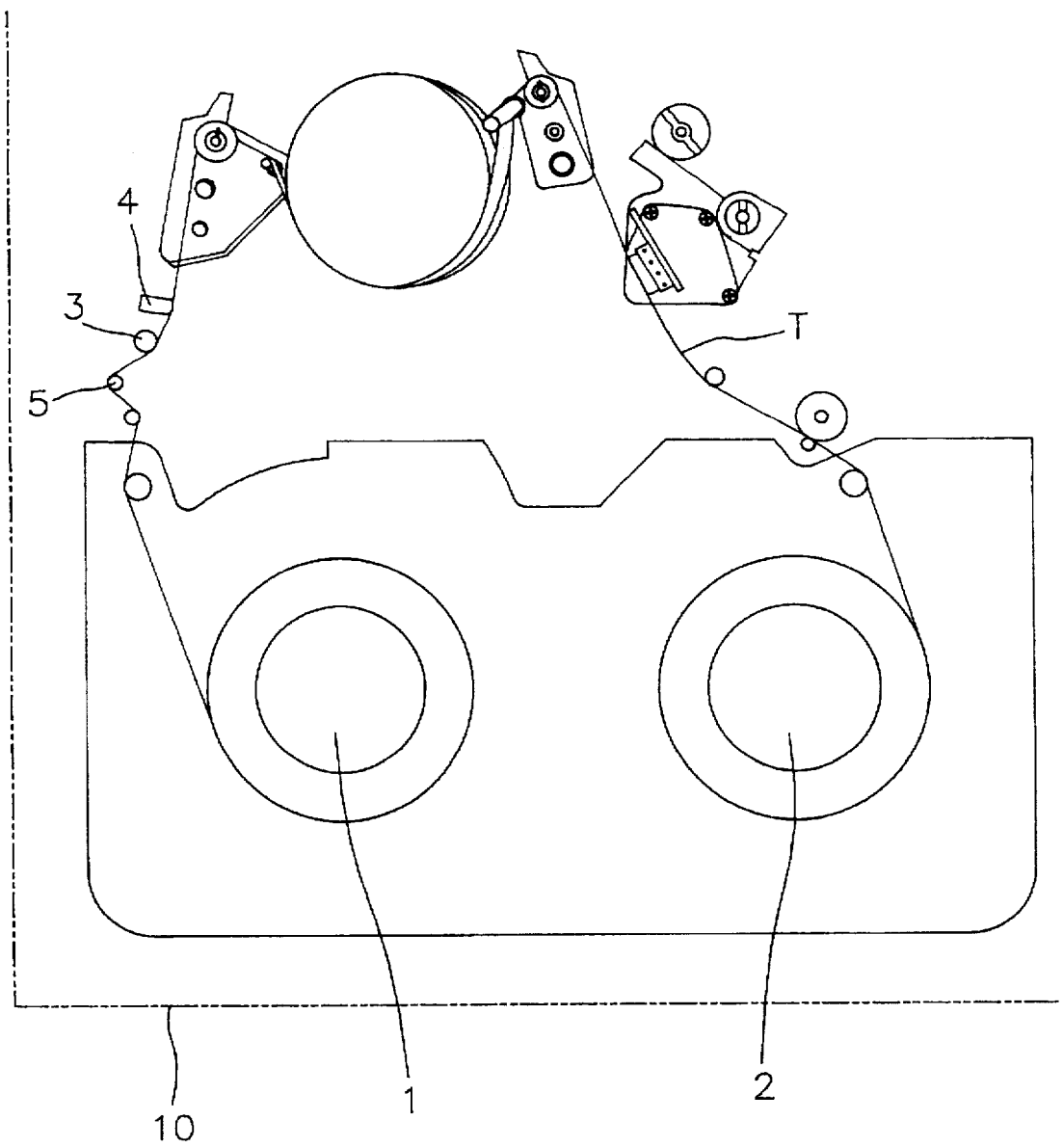
FIG. 1 is a plan view of a deck chassis of a conventional video cassette recorder, illustrating an entire traveling path of a magnetic tape from a supply reel to a take-up reel.

It should be noted that like parts appearing in FIGS. 1 to 4 are represented by like reference numerals so that descriptions concerning these parts are not repeated for the sake of simplicity.

Figure 2:
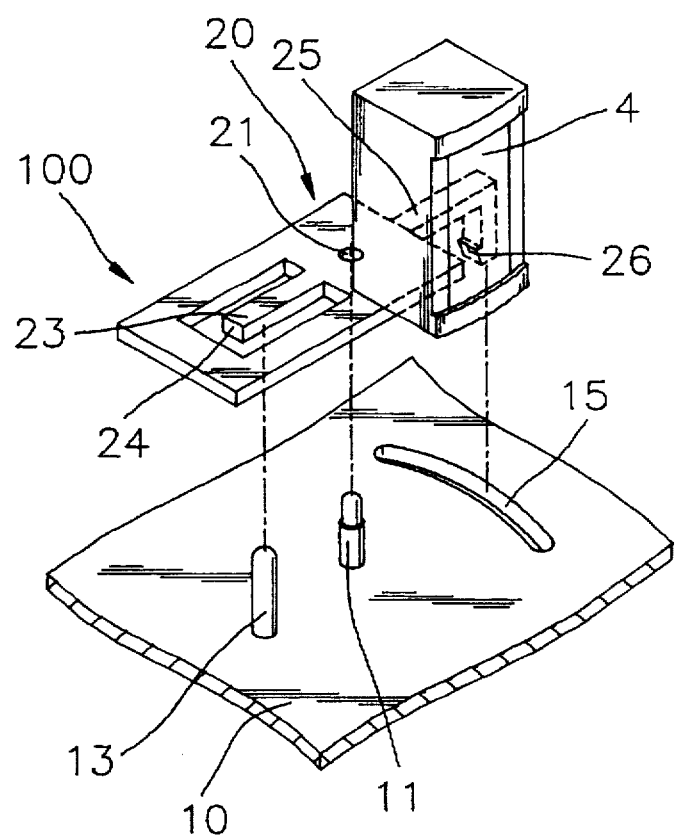
FIG. 2 discloses a perspective view of a full erasing head unit including a full erasing head and a mounting device therefor in accordance with the present invention.

There is illustrated in FIG. 2, a perspective view of an inventive full erasing head unit including a full erasing head 4 and a mounting device 100 therefor.

Figure 3:
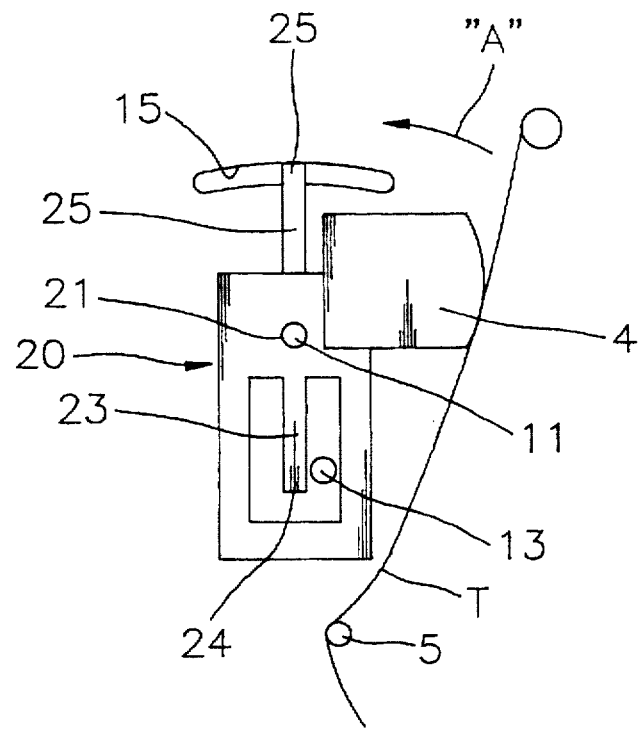
FIG. 3 presents a plan view for illustrating the operating principle of the full erasing head unit in accordance with the present invention.
Figure 4:
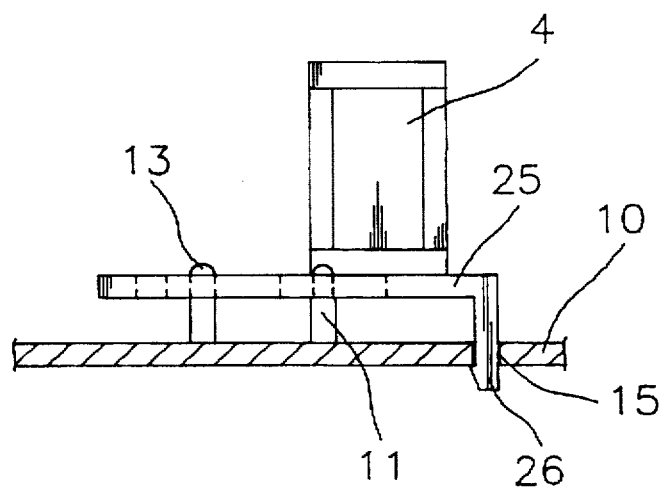
FIG. 4 depicts a cross sectional view of the full erasing head unit in accordance with the present invention.

The mounting device 100 includes a base plate 20 having a hole 21, and a shaft 11 upwardly extending from the deck chassis 10. The base plate 20 is movably disposed on the deck chassis 10 through the shaft 11 inserted into the hole 21 thereof. The base plate 20 is provided with a resilient member 23 whose one end is fixed to the base plate 20 and the other end is free. The resilient member 23 serves to exert an elastic force on the base plate 20 and comes into contact with a pin 13 upwardly extending from the deck chassis 10 at a vicinity of its free end 24, as shown in FIG. 3. The base plate 20 is, further, provided with a L-shaped guide member 25 extending from one end of the base plate 20 and the deck chassis 10 is formed with an arcuate slot 15 for guiding the guide member 25. As shown in FIG. 4, the free end 26 of the guide member 25 is hooked to the arcuate slot 15 so as to allow the guide member 25 to pivot along the arcuate slot 15.

The full erasing head 4 is mounted on the base plate 20 so as to come into contact with the tape T traveling on the deck chassis 10.

The operating principle of the mounting device 100 for the full erasing head 4 will be now described with reference to FIG. 3.

When the traveling tape T has an increased tension, the full erasing head 4 is rotated counterclockwise in the direction indicated by an arrow A, together with the base plate 20. At the same time, the resilient member 23 is elastically deformed since it is supported by the pin 13, and the guide member 25 moves along the arcuate slot 15. Under this condition, the tape tension is absorbed by the resilient member 23, thereby reducing a vibration of the tape T due to the tape tension. When the tape tension becomes reduced, the deformed resilient member 23 returns to its initial position.

In the present invention, the full erasing head is pivotably installed on a deck chassis by means of the mounting device therefor to allow the inventive full erasing head unit to additionally perform the role of an impedance roller, thereby eliminating the need for the impedance roller, which, in turn, leads to a reduced unit cost.

While the present invention has been described with respect to certain preferred embodiments only, other modifications and variations may be made without departing from the scope of the present invention as set forth in the following claims.

What is claimed is:

1. A video cassette recorder incorporating therein a full erasing head unit disposed on a deck chassis thereof, the full erasing head unit comprising:

a full erasing head;

a base member for mounting the full erasing head thereon in such a way that the full erasing head comes into contact with a traveling tape, the base member movably disposed on the deck chassis; and means for pivotably moving the base member, wherein the moving means includes a resilient means for exerting an elastic force on the base member, one end thereof being fixed to the base member and the other end thereof being free, and a pin upwardly extending from the deck chassis, the pin coming into contact with the resilient means in such a way that the resilient means biased by a tape tension is allowed to return to an initial position thereof.

2. The video cassette recorder of claim 1, wherein the moving means further includes a guide member extending from the base member and an arcuate slot for guiding a pivot movement of the base member, the arcuate slot being formed at the deck chassis so as to accommodate the free end of the guide member.

3. A video cassette recorder incorporating therein a full erasing head unit disposed on a deck chassis thereof, the full erasing head unit comprising:

a full erasing head;

a base member for mounting the full erasing head thereon in such a way that the full erasing head comes into contact with a traveling tape, the base member movably disposed on the deck chassis; and means for pivotably moving the base member, wherein the moving means includes a guide member extending from the base member and an arcuate slot for guiding a pivot movement of the base members the arcuate slot being formed at the deck chassis so as to accommodate the free end of the guide member.

4. The video cassette recorder of claim 3, wherein the moving means further includes a resilient means for exerting an elastic force on the base member and a pin upwardly extending from the deck chassis, the pin coming into contact with the resilient means in such a way that the resilient means biased by a tape tension is allowed to return to an initial position thereof.

5. The video cassette recorder of claim 3, wherein one end of the resilient means is fixed to the base member and the other end thereof is free.

* * * * *

UNITED STATES PATENT AND TRADEMARK OFFICE
CERTIFICATEOF CORRECTION

PATENT NO.    : 5,742,460
DATED         : April 21, 1998
INVENTOR(S)   : Ki-Young Park It is certified that error appears in the above-identified patent and that said Letters Patent is hereby corrected as shown below:

On the title page, item
[30]    Foreign Application Priority Data

Nov. 28, 1995  [KR]    Rep. of Korea    95-44374

Signed and Sealed this

Twenty-third Day of June, 1998

Attest:

BRUCE LEHMAN

Attesting Officer    Commissioner of Patents and Trademarks